US012104311B2

(12) United States Patent
Liao et al.

(10) Patent No.: US 12,104,311 B2
(45) Date of Patent: Oct. 1, 2024

(54) STAIN REMOVAL DEVICE USING BLEACH CHEMICAL SOLUTION AND HEAT GENERATION

(71) Applicant: KONINKLIJKE PHILIPS N.V., Eindhoven (NL)

(72) Inventors: Yile Liao, Singapore (SG); Kannan Udayappan Praveen, Singapore (SG); Yong Jiang, Singapore (SG); Lihong Zhao, Singapore (SG)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 533 days.

(21) Appl. No.: 16/634,604

(22) PCT Filed: Jul. 30, 2018

(86) PCT No.: PCT/EP2018/070524
§ 371 (c)(1),
(2) Date: Jan. 28, 2020

(87) PCT Pub. No.: WO2019/030028
PCT Pub. Date: Feb. 14, 2019

(65) Prior Publication Data
US 2020/0157729 A1 May 21, 2020

(30) Foreign Application Priority Data
Aug. 7, 2017 (EP) .................................... 17185105
Dec. 14, 2017 (EP) .................................... 17207319

(51) Int. Cl.
*D06F 43/00* (2006.01)
*C11D 3/395* (2006.01)
(Continued)

(52) U.S. Cl.
CPC ............ *D06F 43/002* (2013.01); *C11D 3/395* (2013.01); *D06F 35/00* (2013.01); *D06L 1/20* (2013.01)

(58) Field of Classification Search
CPC ...... D06F 43/002; D06F 35/00; D06F 43/007; C11D 3/395; D06L 1/00; D06L 4/00; D06L 1/20
(Continued)

(56) References Cited

U.S. PATENT DOCUMENTS 2,254,691 A * 9/1941 MacLelland, Jr. .... D06F 43/002 68/5 A
2,301,227 A * 11/1942 Pickett, Jr. ............ D06F 43/002 68/5 R
(Continued)

FOREIGN PATENT DOCUMENTS

CN 1318118 A 10/2001
CN 2466193 Y 12/2001
(Continued)

OTHER PUBLICATIONS

International Search Report and Written Opionion Dated Nov. 2, 2018 For International Application No. PCT/EP2018/070524 Filed Jul. 30, 2018.

*Primary Examiner* — David G Cormier
*Assistant Examiner* — Thomas Bucci
(74) *Attorney, Agent, or Firm* — Maschoff Brennan

(57) ABSTRACT

Stain removal device (201, 301A, 401A, 301B, 401B) for treating a stained area (101) on a cloth (102). The stain removal device (201, 301A, 401A, 301B, 401B) comprises a heating plate (102) for heating a bleach chemical solution previously dosed onto the stained area (101) of the cloth (102). The stain removal device (201, 301A, 401A, 301B, 401B) further comprises means (302, 203) for absorbing
(Continued)

vapors of the bleach chemical solution generated from the stained area (101) and/or draw air containing said vapors.

15 Claims, 8 Drawing Sheets

(51) Int. Cl.
*D06F 35/00* (2006.01)
*D06L 1/20* (2006.01)

(58) Field of Classification Search
USPC ........................................................ 68/213
See application file for complete search history.

(56) References Cited

U.S. PATENT DOCUMENTS 2,987,906 A * 6/1961 Bourland .............. D06F 43/002 68/213
3,721,026 A * 3/1973 McCallum ............ D06F 43/002 38/75
4,120,180 A * 10/1978 Jedora ................... D06F 43/002 68/205 R
4,926,514 A * 5/1990 Leuenberger ......... D06F 43/002 8/150
5,402,657 A * 4/1995 Henry, Jr. ............. D06F 43/002 68/5 A
7,478,455 B2 1/2009 Heim
7,832,041 B2 11/2010 Smith
2005/0278987 A1* 12/2005 Ching ..................... D06F 75/18 38/77.5
2007/0267049 A1* 11/2007 Righetto ............... A47L 7/0038 134/198
2009/0038082 A1* 2/2009 Barlow ..................... D06L 1/00 68/213
2009/0313767 A1* 12/2009 Tanner .................... D06F 73/00 68/222
2010/0024259 A1* 2/2010 Jiang ....................... D06F 81/08 38/77.9
2013/0219758 A1* 8/2013 Jiang ....................... D06F 73/00 68/222
2014/0013636 A1* 1/2014 Laudahn ................. D06F 75/14 38/77.83
2014/0352366 A1* 12/2014 Seo ......................... D06F 39/02 68/17 R
2015/0218746 A1 8/2015 Clowes
2015/0225891 A1* 8/2015 Clowes ................ C11D 3/3947 134/1
2017/0096758 A1* 4/2017 Fujiwara ................... D06F 7/04
2017/0356121 A1* 12/2017 Perry ...................... A47L 25/00
2018/0142392 A1* 5/2018 Hombroek .............. D06F 29/00
2018/0245258 A1* 8/2018 Shu ..................... A47L 11/4083

FOREIGN PATENT DOCUMENTS

CN 1330738 A 1/2002
CN 104981564 A 10/2015
CN 106917241 7/2017
EP 761862 A1 * 3/1997 ........... D06F 43/002
EP 3159447 4/2017
WO 00/19001 4/2000

* cited by examiner

STAIN REMOVAL DEVICE USING BLEACH CHEMICAL SOLUTION AND HEAT GENERATION

CROSS REFERENCE TO RELATED APPLICATIONS

This application is the U.S. National Phase application under 35 U.S.C. § 371 of International Application No. PCT/EP2018/070524 filed Jul. 30, 2018, published as WO 2019/030028 on Feb. 14, 2019, which claims the benefit of European Patent Application Number 17185105.8 filed Aug. 7, 2017 and European Patent Application Number 17207319.9 filed Dec. 14, 2017. These applications are hereby incorporated by reference herein.

FIELD OF THE INVENTION

The invention relates to the field of stain removal.

BACKGROUND OF THE INVENTION

Hydrogen peroxide ($H_2O_2$) is an oxidizing bleach chemical agent which widely used for disinfecting, medical, and cosmetics.

Low concentration hydrogen peroxide (usually less than 10%, 3% and 6% most common) can be directly purchased on shelf for cleaning and hygiene purpose in household.

As $H_2O_2$ solution is a strong oxidant, active to many organic molecules, reducing agent and is also corrosive to many metals, high concentration $H_2O_2$ (>40%) can be considered hazardous under certain regulations.

Some liquid or gel type of stain removers or laundry detergents also contains certain amount of $H_2O_2$ as bleaching agent to remove staining on clothes.

There exists the following laundry cleaning products on the market:

A first product uses a gel as pre-treatment that works into stain before laundry.

A second product is a portable stain remover with a marker pen size that can be brought outside and directly applied onto clothes.

The bleaching/oxidizing reaction between $H_2O_2$ and stain molecules can be described in general as below.

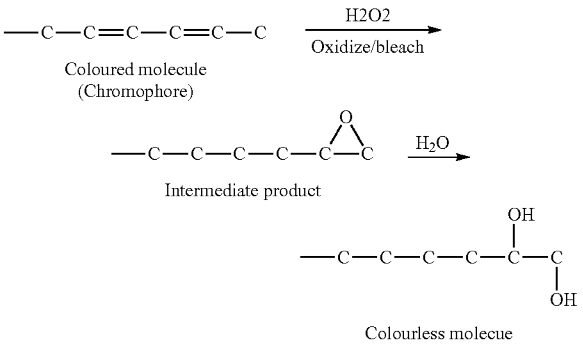

The obtained products of this reaction are oxidized molecules (colourless) and $H_2O$.

As the $H_2O_2$ concentration in commercial stain removing products are low, the bleaching reaction is not as effective and requires comparatively long time to diminish the stain colour, normally 5 min to 30 min waiting time is needed depends on the stain age and stain type.

OBJECT AND SUMMARY OF THE INVENTION

It is an object of the invention to propose a stain removal device that avoids or mitigates above-mentioned problems.

The invention is defined by the independent claims. The dependent claims define advantageous embodiments.

To this end, the stain removal device for treating a stained area on a cloth comprises:

a heating plate for heating a bleach chemical solution previously dosed onto the stained area, a housing for enclosing the stained area and the heating plate, an absorption component for absorbing vapours of said bleach chemical solution generated from the stained area, said absorption component cooperating with said housing and being arranged above said heating plate.

Alternatively, the stain removal device for treating a stained area on a cloth comprises:

a heating plate for heating a bleach chemical solution previously dosed onto the stained area, a housing for enclosing the stained area and the heating plate, a suction fan arranged in said housing to draw air containing vapours of said bleach chemical solution generated from the stained area.

This solution allows removing stain colour very fast (in less than 5 min) by heating up the low concentration (for example 3%) of bleach chemical solution, such as $H_2O_2$, after being applied onto the stained area. It is especially effective on stains that can be oxidized like juice, wine, coffee etc.

The bleaching/oxidizing reaction rate is greatly enhanced due to the high temperature introduced.

After reaction is completed, excess of bleach chemical agent decomposes into $H_2O$ and oxygen slowly, as high temperature is introduced in this process.

Under temperature higher than 100 degrees Celsius, water also can be very effective evaporated out, and resulting in a dry, stain-free clothes.

One advantage of this solution is that removing stain and drying the stained area on the fabric is done at the same time, no water rinsing is required and no chemical residue is left over on clothes.

The absorption component and/or suction fan prevents vapour inhalation and skin contact by user and eliminates any possible health-related side effects.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner.

DETAILED DESCRIPTION OF THE INVENTION

In the following, the invention is described using hydrogen peroxide $H_2O_2$ as bleach chemical agent. However, the invention also applies to any bleach chemical agent containing hydrogen peroxide or peroxy acids, or a mixture of both kinds.

Figure 1:
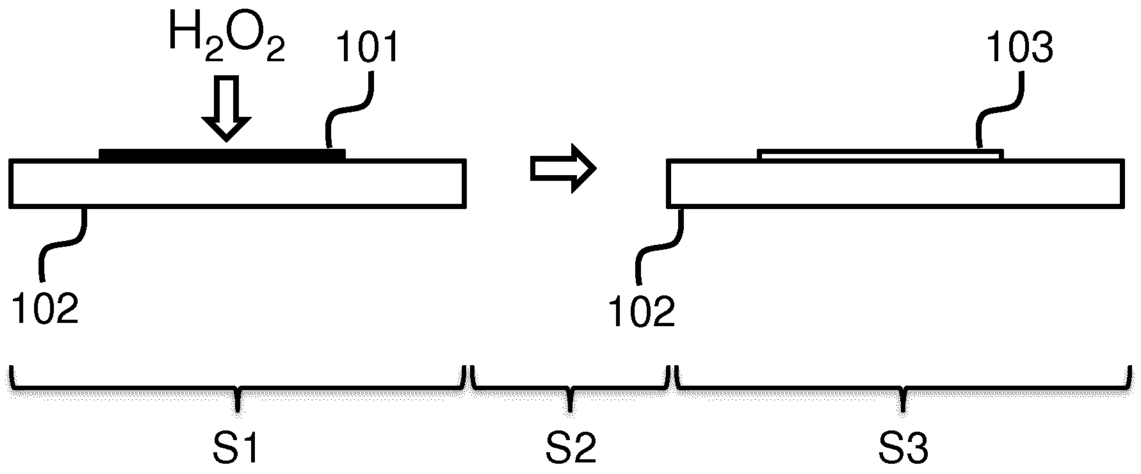
FIG. 1 illustrates the stain removal process according to the invention.

FIG. 1 illustrates the stain removal process according to the invention.

The overall principle of the present invention and stain removal process can be described as follows.

1. First stage S1: $H_2O_2$ solution is sprayed on a stained area 101 of a cloth 102. The $H_2O_2$ solution oxidizes stain molecules from coloured to colourless.
2. Second stage S2: Heating of the sprayed $H_2O_2$ solution up to a temperature more than 100 degree C. in order to:
   1) Accelerate the oxidization reaction rate,
   2) Evaporate the water,
   3) Decompose $H_2O_2$ into water and oxygen.
3. Third stage S3: The stained area 101 has been transformed into a colourless area 103, and the cloth 102 is dry. No water rinsing step is needed as there is no chemical residue left over on the cloth 102.

Figure 2:
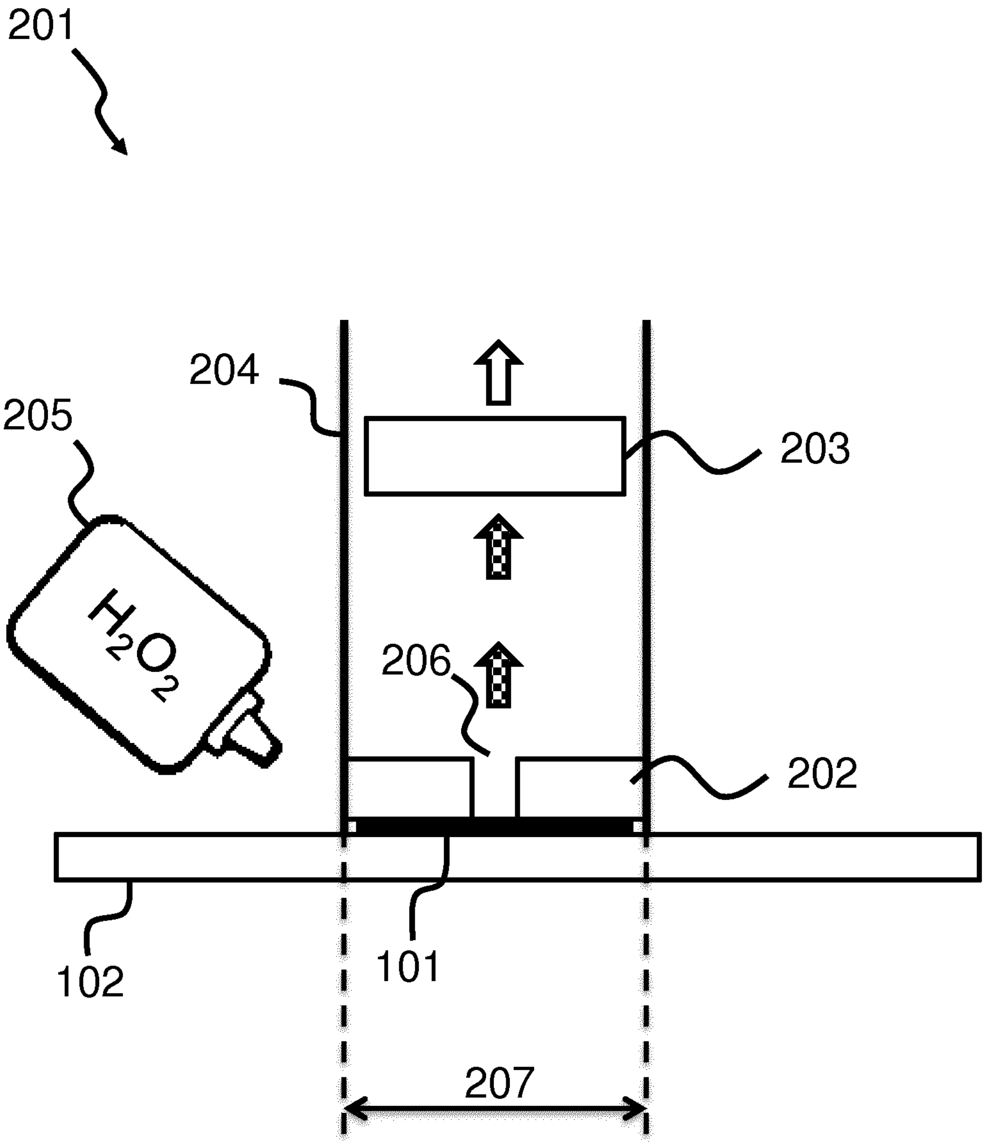
FIG. 2 depicts a first embodiment of a device according to the invention.

FIG. 2 depicts a first embodiment of a device 201 according to the invention. The device 201 comprises:

- a heating plate 202 that is used to heat up the $H_2O_2$ solution previously dosed onto the stained area 101 of the cloth 102,
- a suction fan 203 to draw air containing $H_2O_2$ vapours generated from the stained area 101,
- a housing 204, for example made of plastic, for enclosing the heating plate 202 and the suction fan 203.

The $H_2O_2$ vapours are illustrated by arrows directing upward.

In this embodiment, $H_2O_2$ solution is dosed manually by user on the stained area. For example, a container/bottle/cartridge 205 containing $H_2O_2$ solution can be used to this end.

Preferably, the heating plate 202 comprises at least one hole 206 (for example in a middle part of the heating plate 202) to let $H_2O_2$ vapours pass through. Alternatively or in combination (not shown), the housing 204 has an opening 207 (for example the diameter of the housing 204) which is larger than the heating plate 202 in order to more efficiently enclose the $H_2O_2$ vapours within the housing 204.

Figure 3A:
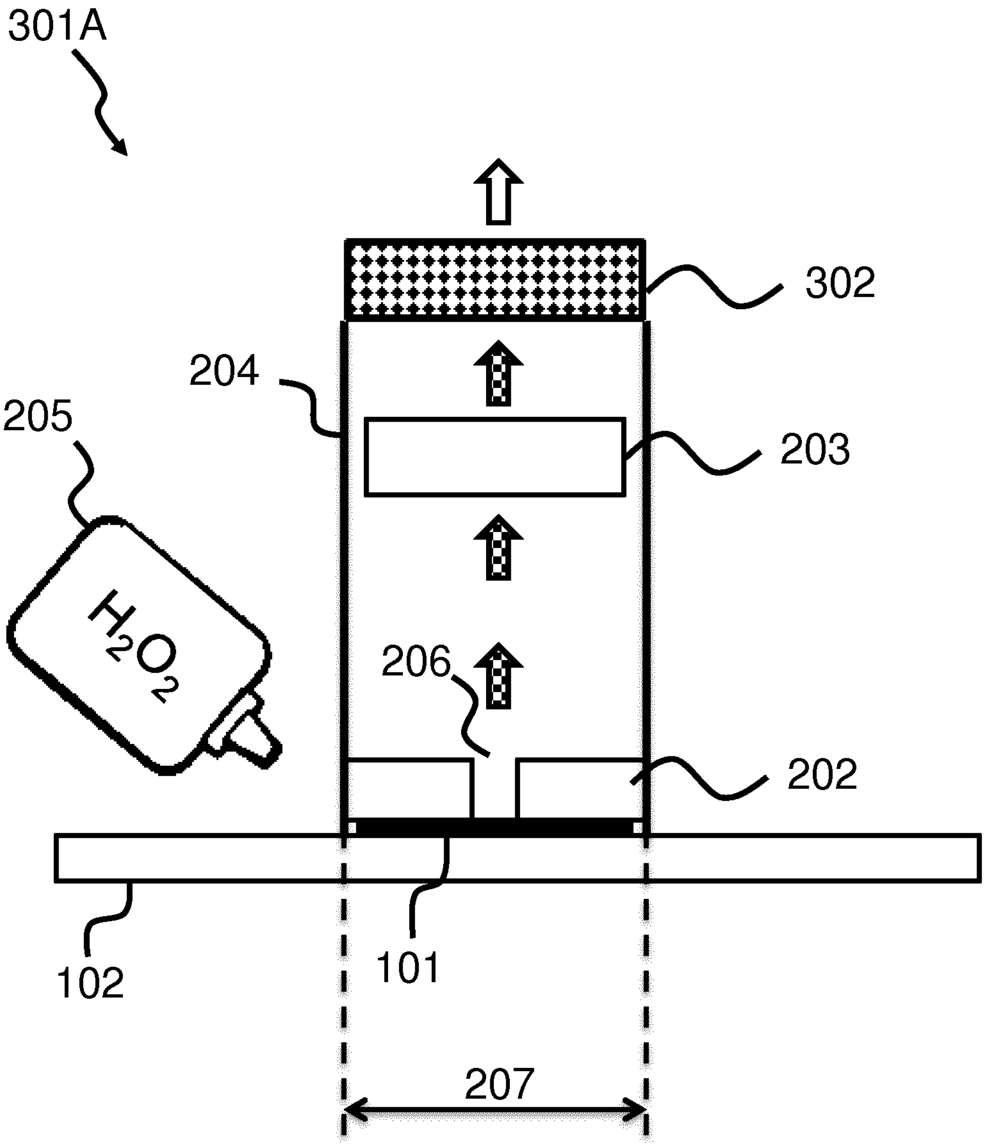
FIG. 3A depicts a second embodiment of a device according to the invention.

FIG. 3A depicts a second embodiment of a device 301A according to the invention. It is based on the embodiment of FIG. 2. The device 301A further comprises:

- an absorption component 302 cooperating with the housing 204 for absorbing the $H_2O_2$ vapours.

Preferably, the absorption component 302 is arranged at a top part of the housing 204.

The housing 204 preferably surrounds the absorption component 302.

The absorption component 302 aims to prevent $H_2O_2$ vapours to propagate around the stain remover device 301A. Indeed, when $H_2O_2$ has a high temperature, some $H_2O_2$ vapours will be released into air which may result in chemical inhalation and skin contact by user.

The absorption component 302 prevents or reduce the possible $H_2O_2$ vapours that would be released around the stain remover device 301A otherwise. $H_2O_2$ or $H_2O_2$-water vapours can be sucked out by the suction fan 203, and passing through the absorption component 302 and been “trapped” or “quenched”.

$H_2O_2$ vapours and/or water vapours pass through the absorption component 302 arranged at a top part of the housing. $H_2O_2$ vapours and/or water vapours are absorbed in the absorption component 302 while passing through it.

Figure 3B:
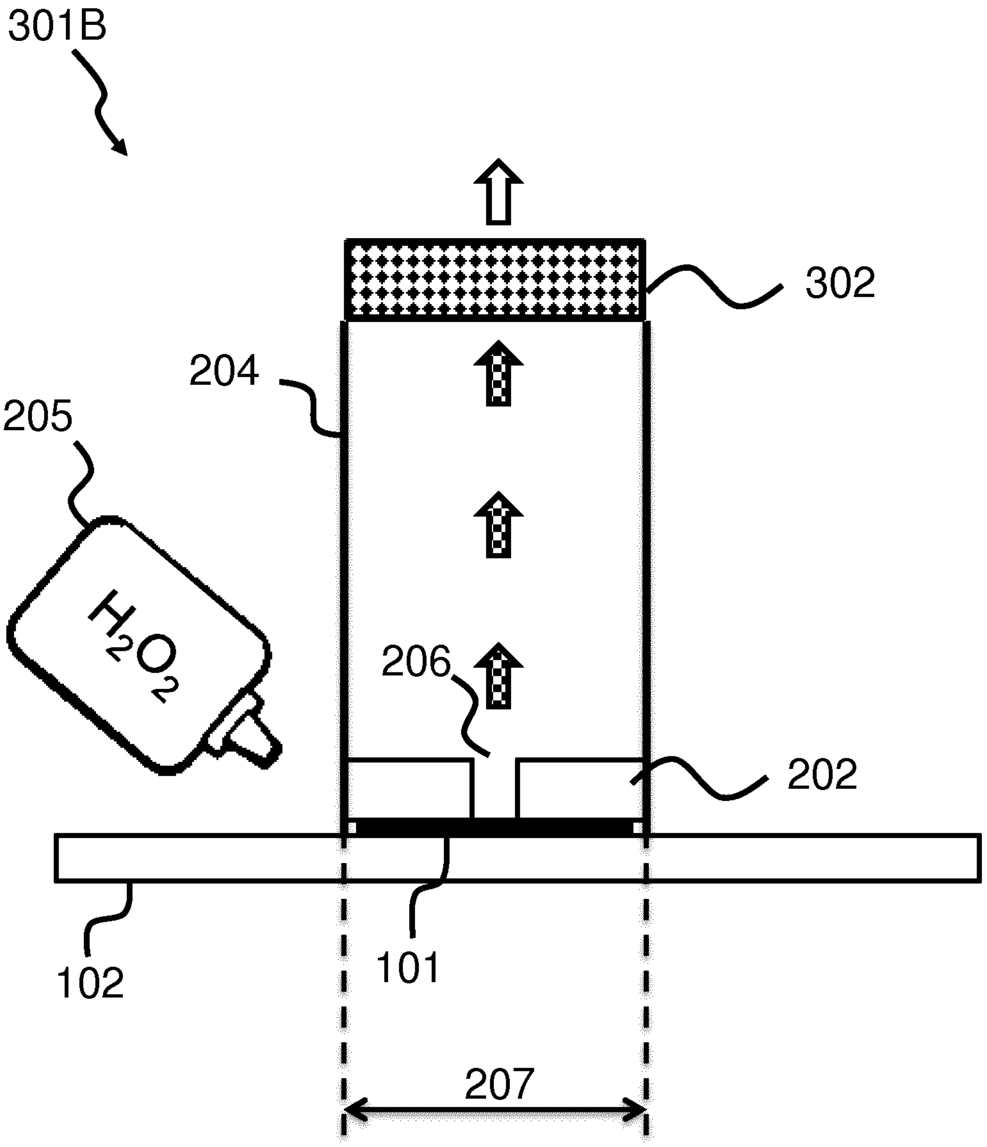
FIG. 3B depicts a device according to the invention corresponding to a modified version of the device depicted in FIG. 3A.

FIG. 3B depicts a device 301B according to the invention corresponding to a modified version of the embodiment depicted in FIG. 3A.

In this embodiment, the suction fan 203 has been removed. Air containing vapours of the bleach chemical solution is no more forced to move towards the absorption component 302. Air containing vapours of the bleach chemical solution is mainly moved by diffusion.

This solution has a lower performance compared to the embodiment of FIG. 3A in terms of speed of absorbing vapours of the bleach chemical solution, but can still achieve an efficient absorption.

Figure 4A:
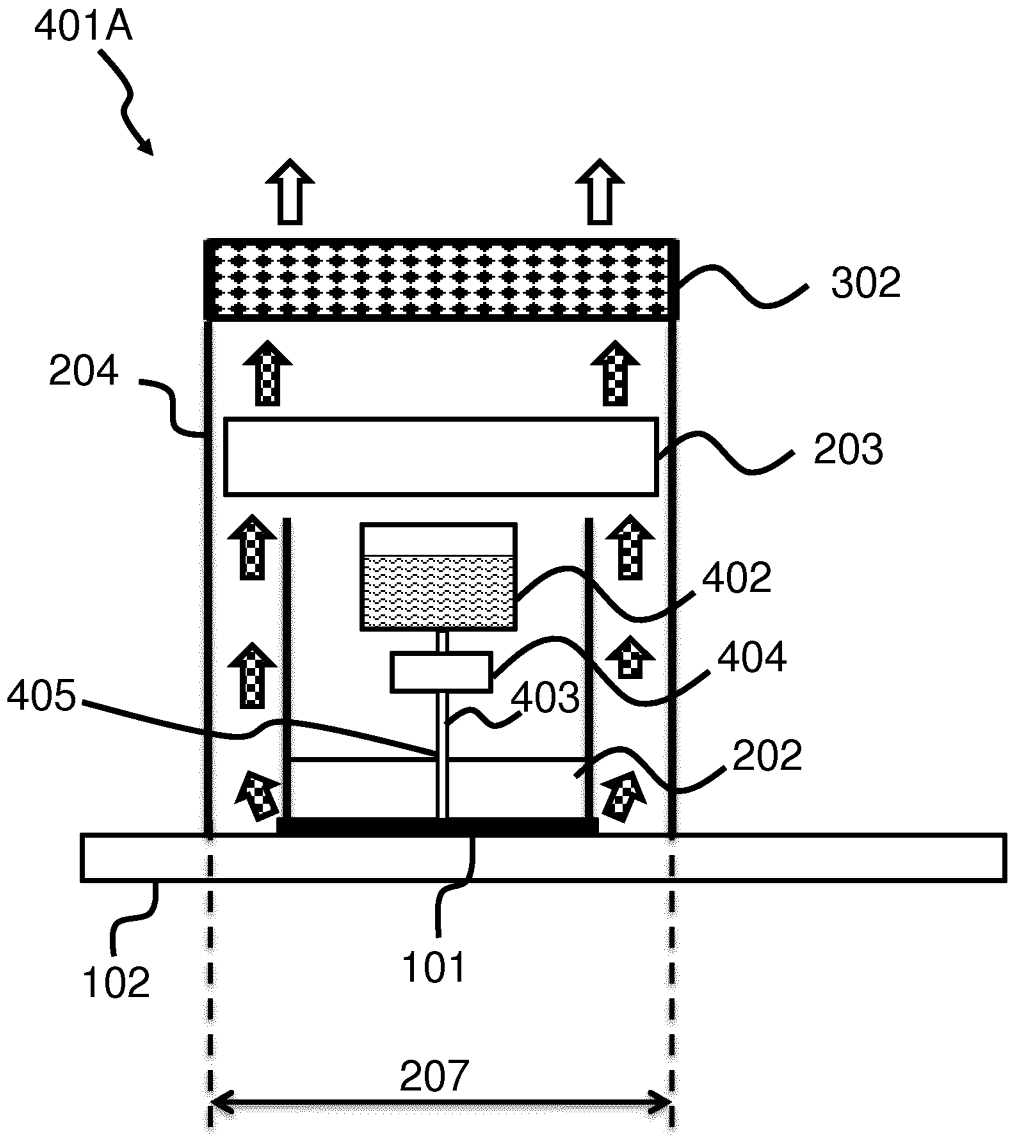
FIG. 4A depicts a third embodiment of a device according to the invention.

FIG. 4A depicts a third embodiment of a device 401A according to the invention. It is based on the device of FIG. 3B. The device 401A comprises:

- a container 402 for storing $H_2O_2$ solution,
- a system to carry $H_2O_2$ solution onto the stained area 101 of the cloth 102. The system may also simply be a tube 403 carrying the $H_2O_2$ solution falling by gravity onto the stained area 101. Alternatively, as represented, the system may further comprise a liquid pump 404 to more effectively carry $H_2O_2$ solution onto the stained area 101 via the tube 403.
- a heating plate 202 that is used to heat up the $H_2O_2$ solution previously dosed onto the stained area 101,
- a suction fan 203 to draw air containing $H_2O_2$ vapours generated from the stained area 101,
- an absorption component 302 arranged at a top part of the housing for absorbing $H_2O_2$ vapours,
- a housing 204, for example made of plastic, for enclosing the heating plate 202, the container 402, the system 403-404 to carry $H_2O_2$ solution, the suction fan 203, and the absorption component 302.

As illustrated, the vapours are caused to flow around the heated plate 202 within the housing 204, in direction of the absorption component 302.

Preferably, the heating plate 202 comprises a hole 405 (for example in its middle) in order to let the $H_2O_2$ solution pass through it and reach the stained area 101. The hole 405 receives the pipe 403.

Preferably, as illustrated, the housing 204 has an opening 207 (for example corresponding to its diameter, if the housing 204 has a cylindrical shape) which is larger than the heating plate 202 to more efficiently enclose the $H_2O_2$ vapours within the housing.

Figure 6A:
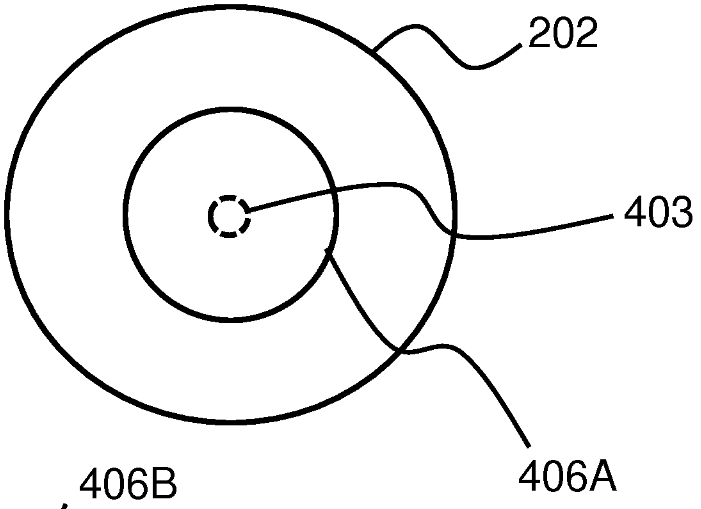
FIG. 6A, FIG. 6B, FIG. 6C depict various embodiments of a heating plate used in a device according to the invention.

Alternatively, when the heating plate 202 is as large as the opening 207 of the housing 204, the heating plate 202 preferably comprises at least one hole to allow $H_2O_2$ vapours and/or water vapours be carried out of the stained area 101:

A first embodiment is illustrated in FIG. 6A: this embodiment comprises one hole 406A arranged in a central part of the heating plate 202, and having a diameter larger than the pipe 403.

Figure 6B:
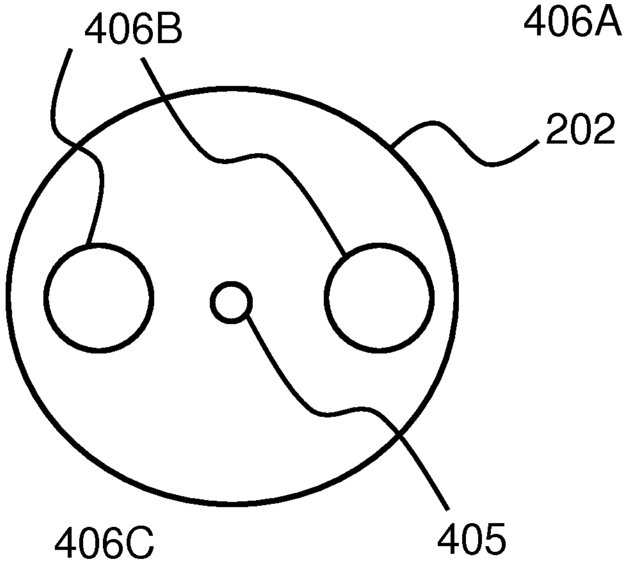

A second embodiment is illustrated in FIG. 6B: this embodiment comprises two holes 406B arranged in the heating plate 202.

Figure 6C:
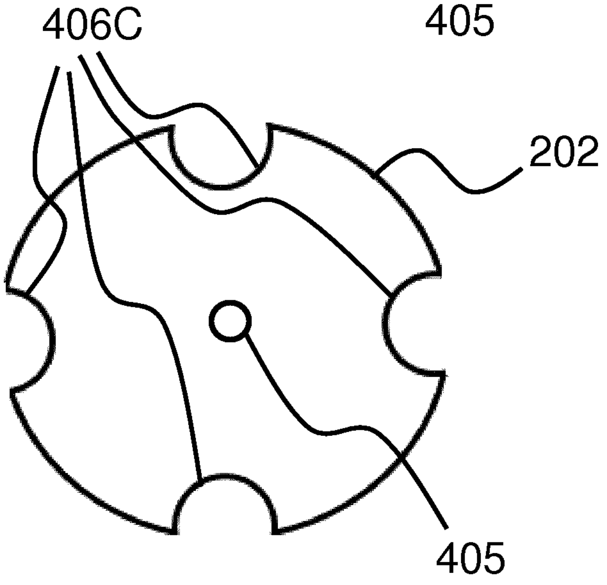

A third embodiment is illustrated in FIG. 6C: this embodiment comprises four (partial) holes 406C arranged in the heating plate 202.

In those embodiments, $H_2O_2$ vapours and/or water vapours are carried in the central part of housing 204, around the container 402.

The absorption component 302 works same as in the embodiment of FIG. 3. The $H_2O_2$ vapours and/or water vapours pass through the absorption component at a top part of the housing. $H_2O_2$ vapours and/or -water vapours are absorbed in the absorption component while passing through.

Any material that is able to absorb water or water vapours or react with $H_2O_2$ can be used in the absorption component. For example, materials that absorb water (desiccant) include silica beads (indicating silica), silica gel, calcium sulfate, calcium oxide, calcium chloride, montmorillonite, molecular sieve, etc.

Materials that react with $H_2O_2$ include active carbon, catalysis like metal ions and enzyme, reducing agent like ferrous sulfate, etc.

The absorption component 302 can be formed by or filled-in with a single material mentioned above, or a combination of material mentioned above.

Figure 4B:
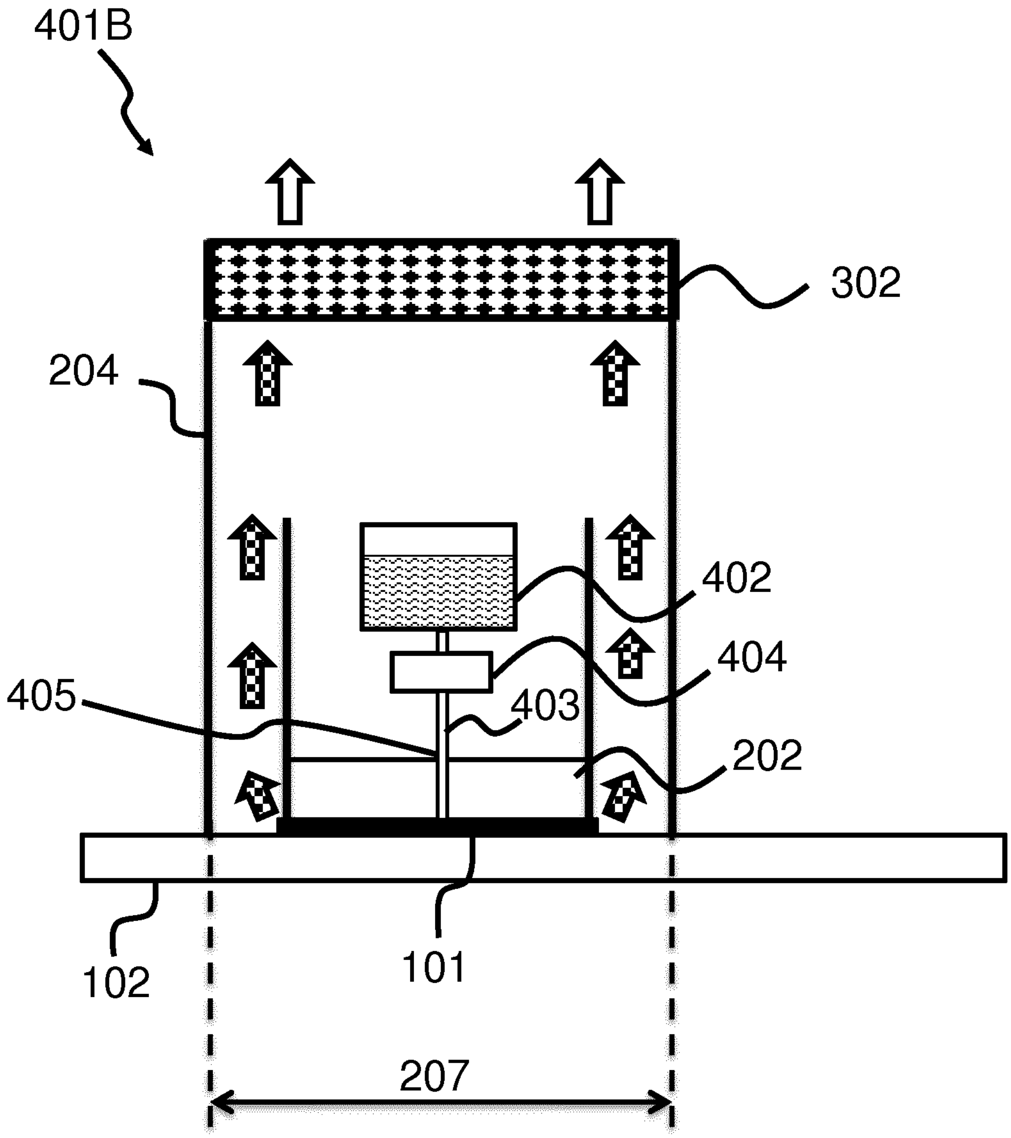
FIG. 4B depicts a device according to the invention corresponding to a modified version of the embodiment depicted in FIG. 4A.

FIG. 4B depicts a device 401B according to the invention corresponding to a modified version of the embodiment depicted in FIG. 4A.

In this embodiment, the suction fan 203 has been removed. Air containing vapours of the bleach chemical solution is no more forced to move towards the absorption component 302. Air containing vapours of the bleach chemical solution is mainly moved by diffusion.

This solution has a lower performance compared to the embodiment of FIG. 4A in terms of speed of absorbing vapours of the bleach chemical solution, but can still achieve an efficient absorption.

Figure 5:
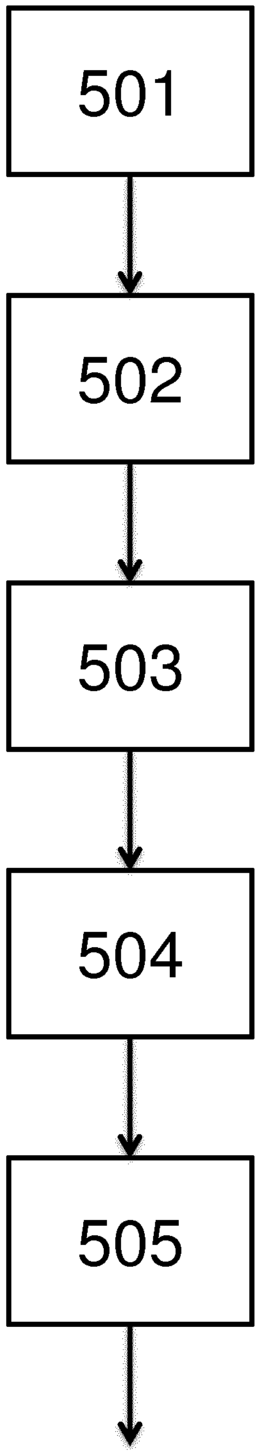
FIG. 5 depicts a flow chart of a method according to the invention.

FIG. 5 depicts a flow chart of a method according to the invention of treating a stained area 101 on a cloth 102. The method comprises:

a step 501 of dosing a bleach chemical solution (for example $H_2O_2$) onto the stained area of the cloth, a step 502 of heating the stained area, a step 503 of enclosing the heated stained area 101, a step 504 of absorbing vapours of said bleach chemical solution generated from the stained area.

Preferably, the method also comprises a step 505 of drawing air containing said vapours.

In the above description, the bleach chemical solution in the container (205, 402) for example comprises hydrogen peroxide $H_2O_2$.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A stain removal device for treating a stained area on a cloth, the stain removal device comprising:

a heating plate for heating a bleach chemical solution previously dosed onto the stained area via a tube, wherein the heating plate has at least one hole that receives the tube, a housing for enclosing the stained area of the cloth and the heating plate, wherein the housing has an opening with a size larger than a size of the heating plate, and an absorption component for absorbing vapours of said bleach chemical solution generated from the stained area, said absorption component cooperating with said housing and being arranged above said heating plate.

2. The stain removal device of claim 1, further comprising a suction fan arranged in said housing to draw air containing said vapours.

3. A stain removal device for treating a stained area on a cloth, the device comprising:

a heating plate for heating a bleach chemical solution previously dosed onto the stained area via a tube, wherein the heating plate has at least one hole that receives the tube, a housing for enclosing the stained area of the cloth and the heating plate, wherein the housing has an opening with a size as large as a size of the heating plate, and a suction fan arranged in said housing to draw air containing vapours of said bleach chemical solution generated from the stained area.

4. The stain removal device of claim 3, further comprising an absorption component cooperating with said housing for absorbing said vapours.

5. The stain removal device of claim 1, wherein said absorption component is arranged at a top part of the housing.

6. The stain removal device of claim 1, wherein the heating plate comprises the at least one hole to let said vapours pass through.

7. The stain removal device of claim 1, further comprising a container for storing the bleach chemical solution and the tube to carry the bleach chemical solution onto the stained area.

8. The stain removal device of claim 7, wherein the tube to carry the bleach chemical solution comprises a liquid pump.

9. The stain removal device of claim 1, wherein the heating plate comprises the at least one hole to let the bleach chemical solution pass through.

10. The stain removal device of claim 1, wherein the absorption component is made of any one of the following materials: silica beads, silica gel, calcium sulfate, calcium oxide, calcium chloride, montmorillonite, molecular sieve, active carbon, metal ions and enzyme, and ferrous sulfate.

11. A container for containing a bleach chemical solution, said container being adapted to cooperate with the stain removal device of claim 1.

12. The container of claim 11, said container corresponding to a refillable tank.

13. The container of claim 12, said container corresponding to a removable cartridge.

14. A method of treating a stained area on a cloth, comprising the steps of:

dosing a bleach chemical solution onto the stained area, heating, by a heating plate, the stained area via a tube, wherein the heating plate has at least one hole that receives the tube, enclosing, by a housing, the heated stained area of the cloth, wherein the housing has an opening with a size larger than a size of the heating plate, and absorbing vapours, by an absorption component, of said bleach chemical solution generated from the stained area.

15. The method of claim 14, further comprising the step of:

drawing air containing said vapours.

* * * * *